United States Patent
Suzuki et al.

(10) Patent No.: US 8,395,072 B2
(45) Date of Patent: Mar. 12, 2013

(54) RESISTANCE WELDING QUALITY DETERMINATION METHOD AND RESISTANCE WELDING QUALITY DETERMINATION APPARATUS

(75) Inventors: Kenichi Suzuki, Toyohashi (JP); Yugo Nakagawa, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 688 days.

(21) Appl. No.: 12/591,213

(22) Filed: Nov. 12, 2009

(65) Prior Publication Data

US 2010/0140228 A1 Jun. 10, 2010

(30) Foreign Application Priority Data

Dec. 9, 2008 (JP) ................................ 2008-313320

(51) Int. Cl.
*B23K 11/25* (2006.01)
(52) U.S. Cl. .................................. 219/78.01; 219/117.1
(58) Field of Classification Search ............... 219/78.01, 219/117.1
See application file for complete search history.

(56) References Cited

U.S. PATENT DOCUMENTS

| | | | | |
|---|---|---|---|---|
| 4,434,351 A * | 2/1984 | Nakata et al. | ............... | 219/117.1 |
| 4,442,337 A * | 4/1984 | Nakata et al. | ............... | 219/117.1 |
| 4,503,312 A * | 3/1985 | Nakata et al. | ............... | 219/117.1 |
| 4,849,601 A * | 7/1989 | Haefner et al. | ............... | 219/110 |
| 4,999,477 A * | 3/1991 | Yamaguchi et al. | ........... | 219/110 |
| 5,229,568 A * | 7/1993 | Gobez et al. | ................... | 219/110 |
| 5,347,105 A * | 9/1994 | Kawai | ........................ | 219/110 |
| 5,591,355 A * | 1/1997 | Ishikawa | ........................ | 219/110 |
| 5,892,197 A * | 4/1999 | Goto et al. | ..................... | 219/110 |
| 6,057,523 A * | 5/2000 | Fujii et al. | ..................... | 219/110 |
| 6,140,825 A * | 10/2000 | Fujii et al. | ..................... | 324/718 |
| 6,335,504 B1 * | 1/2002 | Ling et al. | ..................... | 219/109 |
| 7,291,803 B2 * | 11/2007 | Karakas | ........................ | 219/110 |

FOREIGN PATENT DOCUMENTS

| | | |
|---|---|---|
| JP | A-57-039083 | 3/1982 |
| JP | A-09-196881 | 7/1997 |
| JP | A-09-239556 | 9/1997 |
| JP | A-10-314956 | 12/1998 |
| JP | A-2004-195521 | 7/2004 |

OTHER PUBLICATIONS

Dec. 25, 2012 Office Action issued in Japanese Patent Application No. 2008-313320 (with translation).

* cited by examiner

*Primary Examiner* — Long Tran
*Assistant Examiner* — Jordan Klein
(74) *Attorney, Agent, or Firm* — Oliff & Berridge, PLC

(57) ABSTRACT

A resistance welding quality determination method comprises: a step of detecting a voltage value applied to a welding electrode of a resistance welding machine; a step of detecting a current value supplied to the welding electrode; a step of calculating a welding resistance value based on the voltage value and the current value; a step of correcting the welding resistance value based on a change amount of a contact resistance value between the work and the welding electrode during welding of a work; and a step of determining welding quality of the work based on a corrected welding resistance value obtained by correcting the welding resistance value.

14 Claims, 13 Drawing Sheets

RESISTANCE WELDING QUALITY DETERMINATION METHOD AND RESISTANCE WELDING QUALITY DETERMINATION APPARATUS

TECHNICAL FIELD

The present invention relates to a method and an apparatus for determining the welding quality of a work or workpiece (an object to be welded) in a welding process for resistance welding the work by using a resistance welding machine.

BACKGROUND ART

In recent years, for a welding process for resistance welding a work (an object to be welded) by using a resistance welding machine, various methods and apparatuses have been proposed to determine the welding quality of the work (i.e., evaluate the quality of a welded portion of the work) (for example, Patent Literatures 1 and 2).

Patent Literature 1 discloses the following method. During a current change period in which an instantaneous value of welding current changes, the welding current and an instantaneous value of inter-tip voltage are first detected. Then, an instantaneous value of apparent inter-tip dynamic resistance is calculated based on both the detected values. A change rate of a dynamic resistance instantaneous value of the inter-tip dynamic resistance at an arbitrary time during the current change period is calculated. Thus, the welding quality of a resistance welded portion is evaluated by use of change characteristics of the dynamic resistance instantaneous value change rate calculated in correspondence with the number of generations during the current change period.

Patent Literature 2 discloses the following method. A moving average value of voltage applied to a welding electrode of an alternating resistance welding machine at predetermined time intervals is first calculated as a moving average voltage value. Then, a moving average value of current flowing in the welding electrode of the alternating resistance welding machine at predetermined time intervals is calculated as a moving average current value. A moving average resistance value is subsequently calculated based on the moving average voltage value and the moving average current value. Thus, the calculated moving average resistance value is compared with a previously set threshold to determine whether or not splash occurs in a joined portion by the resistance welding.

In Patent Literatures 1 and 2, as mentioned above, the welding quality is determined based on the resistance value between welding electrodes (tips). However, during welding of the work, there is a case where contact resistance between the work and the welding electrode varies. For instance, in the case where the work is pressed by a movable gun arm provided at its distal end with a welding electrode to resistance-weld the work, the gun arm may vibrate in a pressing direction during resistance welding. This vibration of the gun arm may cause variation in contact resistance between the work and the welding electrode. In this case, the variation in contact resistance is reflected in a resistance value between the welding electrodes (tips).

However, the variation in contact resistance between the work and the welding electrode is completely unrelated to the change of a welding state (welding quality) of a welded portion (a joined portion). Accordingly, the conventional technique of determining whether the welding quality is good or bad based on the resistance value between the welding electrodes (tips) in which the contact resistance variation is reflected could not appropriately determine the welding quality of the work.

CITATION LIST

Patent Literature

Patent Literature 1: JP 10 (1998)-314956 A
Patent Literature 2: JP 2004-195521 A

SUMMARY OF INVENTION

Technical Problem

The present invention has been made in view of the circumstances to solve the above problems and has a purpose to provide a resistance welding quality determination method and a resistance welding quality determination apparatus capable of accurately determining the resistance welding quality of a work (an object to be welded) without being influenced by variation in contact resistance between the work and welding electrodes.

Solution to Problem

To achieve the above purpose, one aspect of the invention provides a method of determining welding quality of a work in a welding process for resistance welding the work by use of a resistance welding machine, comprising the steps of: detecting a voltage value applied to a welding electrode of the resistance welding machine during welding of the work; detecting a current value supplied to the welding electrode of the resistance welding machine during welding of the work; calculating a welding resistance value based on the voltage value and the current value; correcting the welding resistance value based on a change amount in contact resistance between the work and the welding electrode during welding of the work; and determining the welding quality of the work based on a corrected welding resistance value obtained by correcting the welding resistance value.

In the above resistance welding quality determination method, the welding resistance value (a resistance value between the welding electrodes calculated based on the detected voltage value and the detected current value during welding of the work (an object to be welded)) is corrected based on the change amount in contact resistance between the work and the welding electrode (hereinafter, also simply referred to as contact resistance) during welding of the work. Accordingly, even when the contact resistance between the work and the welding electrode varies during the work welding, this method can obtain an appropriate welding resistance value (an appropriate corrected welding resistance value) from which the influence of variation in this contact resistance is eliminated (that is, in which variation in the contact resistance is not reflected).

In the above method, furthermore, the welding quality of the work is evaluated based on the above corrected welding resistance value. This makes it possible to accurately determine the quality of resistance welding of the work without being influenced by variation in the contact resistance between the work and the welding electrode.

In the above method, preferably, the resistance welding machine includes a movable gun unit having a movable gun arm and the welding electrode fixed to a distal end of the movable gun arm, the gun unit being configured to move to press the work through the welding electrode, the method further comprises a step of detecting acceleration of the movable gun unit in a direction of pressing the work by the welding electrode during welding of the work, and the step of correcting the welding resistance value includes correcting the welding resistance value based on a change amount in the welding resistance corresponding to the acceleration in the step of detecting acceleration of the movable gun unit.

As mentioned above, the contact resistance varies under the influence of vibration of the movable gun arm. When the gun arm vibrates, the movable gun unit is accelerated. According to the acceleration of the gun unit, a change amount in contact resistance between the work and the welding electrode is determined.

The above method is therefore achieved by detecting the acceleration of the movable gun unit in the direction of pressing the work by the welding electrode, and correcting the welding resistance value based on the change amount in contact resistance corresponding to the detected acceleration of the movable gun unit. This method enables appropriate ascertainment of the change amount in contact resistance between the work and the welding electrode to appropriately correct the welding resistance value.

The change amount in contact resistance corresponding to the acceleration of the movable gun unit can be obtained based on the corresponding relation between the previously ascertained acceleration of the movable gun unit and the change amount in contact resistance. To be concrete, the data map representing the corresponding relation between the acceleration of the movable gun unit and the change amount in contact resistance and the relational expression derived from such corresponding relation are prepared in advance (stored in a microcomputer or the like in a test device). Using those data map and relational expression, it is possible to determine the change in contact resistance corresponding to the detected acceleration of the movable gun unit.

The corresponding relation between the acceleration of the movable gun unit and the change amount in contact resistance can be ascertained in advance in the following manner. To be specific, the work is actually resistance-welded by use of the resistance welding machine, and the acceleration of the movable gun unit, the voltage value between the work and the welding electrode, and the current value supplied to the welding electrode are detected at predetermined time intervals during the welding period. Based on the voltage value and the current value at each predetermined time interval, the contact resistance value between the work and the welding electrode at each of the predetermined time intervals is calculated. Accordingly, the contact resistance value corresponding to the acceleration of the movable gun unit can be obtained at each of the predetermined time intervals. This corresponding relation is converted to the corresponding relation assuming that the contact resistance value for acceleration of zero is a reference (a change amount: zero). Consequently, the corresponding relation between the acceleration of the movable gun unit and the change amount in contact resistance can be obtained.

In the resistance welding quality determination method mentioned above, preferably, the step of correcting the welding resistance value including calculating the corrected welding resistance value by obtaining a change amount in the contact resistance corresponding to the acceleration in the step of detecting acceleration of the movable gun unit based on the corresponding relation between the previously ascertained acceleration of the gun unit and the change amount in the contact resistance, and then subtracting the change amount in that contact resistance from the welding resistance value.

This method can obtain an appropriate welding resistance value (an appropriate corrected welding resistance value) in which no contact resistance variation is reflected (from which the influence of the variation is eliminated).

The corresponding relation between the acceleration of the movable gun unit and the change amount in the contact resistance can be ascertained in advance as mentioned above. The acceleration is indicated by assuming the direction of pressing the work by the welding electrode (the direction from the welding electrode toward the work) as negative and an opposite direction to the pressing direction (the direction from the work toward the welding electrode) as positive.

Furthermore, in one of the aforementioned methods, preferably, the step of determining the welding quality includes determining whether or not splash occurs in a welded portion of the work by comparing the corrected welding resistance value with a previously set threshold.

According to the above resistance welding quality determination method, it is possible to appropriately detect the occurrence of splash (spattering of molten metal) in the welded portion of the work.

When splash occurs, the corrected welding resistance value (specifically, a resistance value of the welded portion) increases more as compared with that when no splash occurs. Accordingly, the threshold is set in advance between the corrected welding resistance value obtained when splash occurs and the corrected welding resistance value obtained when no splash occurs. If the corrected welding resistance value obtained during the resistance welding exceeds the threshold, it is determined that splash occurs.

The method of comparing the corrected welding resistance value with the previously set threshold may be achieved for example by creating in advance a data map representing the corresponding relation between the welding time and the threshold, and comparing the corrected welding resistance value obtained at each of the predetermined welding time intervals with the threshold corresponding to each welding time.

In the above method, preferably, the work is a battery component to be welded while it is placed in the battery case, and the quality of resistance welding of the battery component is determined in the welding process for resistance welding the battery component placed in the battery case by use of the resistance welding machine.

In one of the above methods, preferably, the resistance welding machine includes a movable gun unit having a movable gun arm and the welding electrode fixed to a distal end of the movable gun arm, the gun unit being configured to move to press the work through the welding electrode, and the movable gun arm has a shape extending in a direction perpendicular to the pressing direction of the work by the welding electrode.

To achieve the above purpose, another aspect of the invention provides an apparatus for determining welding quality of a work in a welding process for resistance welding the work by use of a resistance welding machine, the apparatus comprising: a welding resistance value calculating section for calculating a welding resistance value based on a voltage value applied to a welding electrode of the resistance welding machine and a current value supplied to the welding electrode; a welding resistance value correcting section for correcting the welding resistance value based on a change amount in contact resistance between the work and the welding electrode during welding of the work; and a welding quality determining section for determining welding quality of the work based on a corrected welding resistance value obtained by correcting the welding resistance value.

In the resistance welding quality determination apparatus mentioned above, the welding resistance value correcting section corrects the welding resistance value (a resistance value between the welding electrodes calculated based on the voltage value and the current value both detected during welding of the work (an object to be welded)) based on the change amount in the contact resistance between the work and the welding electrode during welding of the work (hereinafter, also simply referred to as contact resistance). Accordingly, even when the contact resistance between the work and the welding electrode varies during the work welding, this apparatus can obtain an appropriate welding resistance value (a corrected welding resistance value) from which the influence of variation in this contact resistance is eliminated (that is, in which variation in the contact resistance is not reflected).

In the above apparatus, furthermore, the welding quality determining section determines the welding quality of the work based on the corrected welding resistance value. This makes it possible to accurately determine the quality of resistance welding of the work without being influenced by variation in contact resistance between the work and the welding electrode.

In the above apparatus, preferably, the resistance welding machine includes a movable gun unit having a movable gun arm and the welding electrode fixed to a distal end of the movable gun arm, the gun unit being configured to move to press the work through the welding electrode, and the welding resistance value correcting section is configured to correct the welding resistance value based on a change amount in the contact resistance corresponding to the acceleration of the movable gun unit in a direction of pressing the work by the welding electrode.

Furthermore, in one of the above apparatuses, preferably, the welding quality determining section is configured to determine whether or not splash occurs in a welded portion of the work by comparing the corrected welding resistance value with a previously set threshold.

DESCRIPTION OF EMBODIMENTS

A detailed description of a preferred embodiment of the present invention will now be given referring to the accompanying drawings.

A welding process in this embodiment is first explained. In this embodiment, by use of a resistance welding system 1 (see FIG. 4), resistance welding of battery components 165 and 166 (see FIG. 3) placed in a battery case 110 (see FIGS. 1 to 3) is performed.

Figure 1:
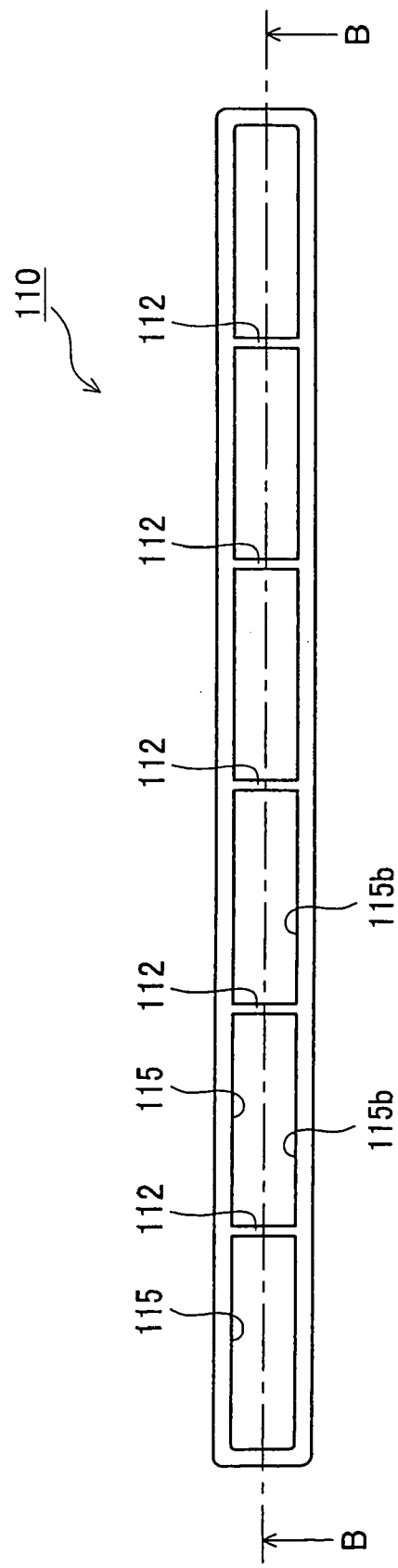
FIG. 1 is a top view of a battery case in an embodiment.
Figure 2:
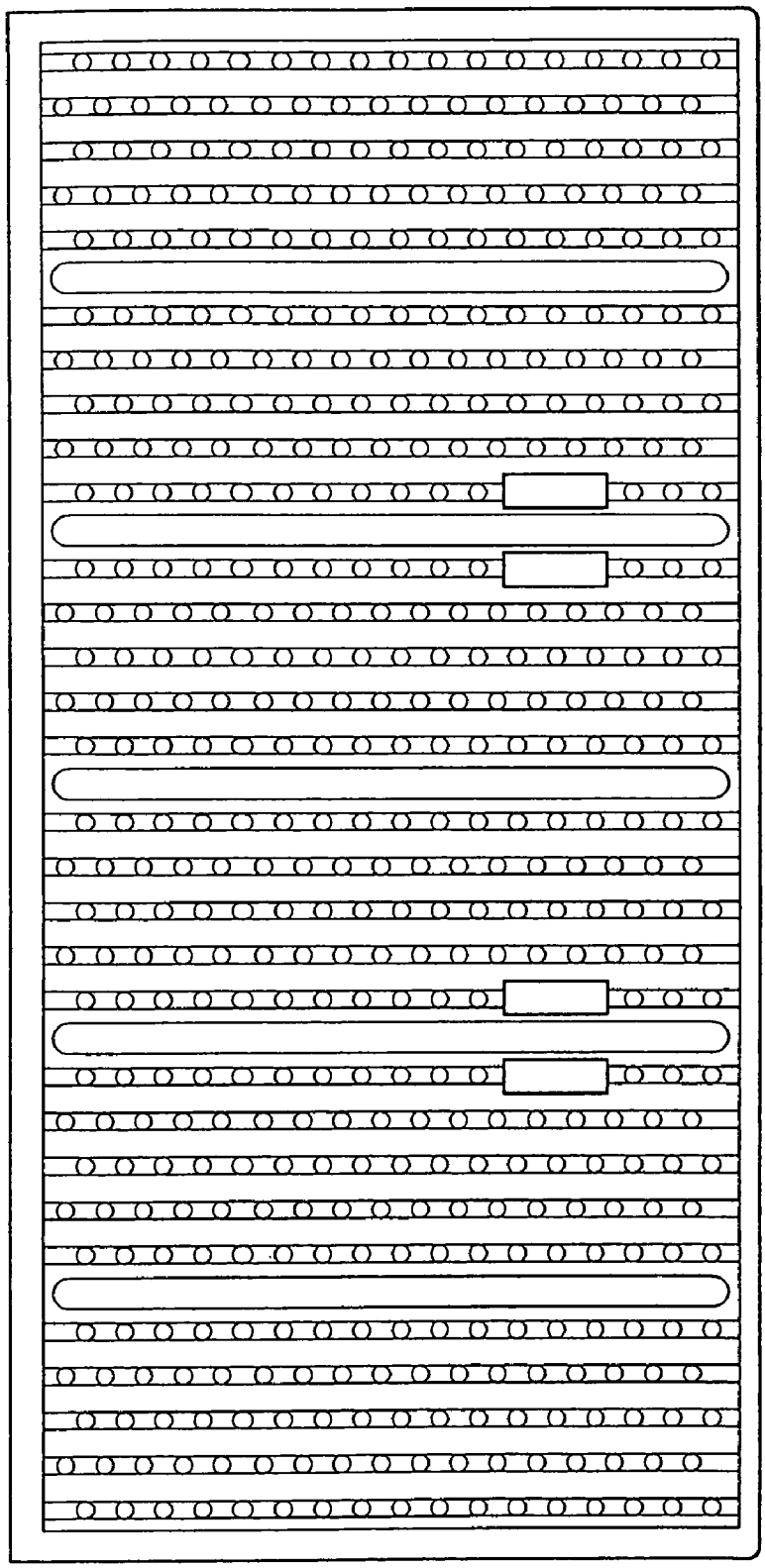
FIG. 2 is a front view of the battery case in the embodiment.
Figure 12:
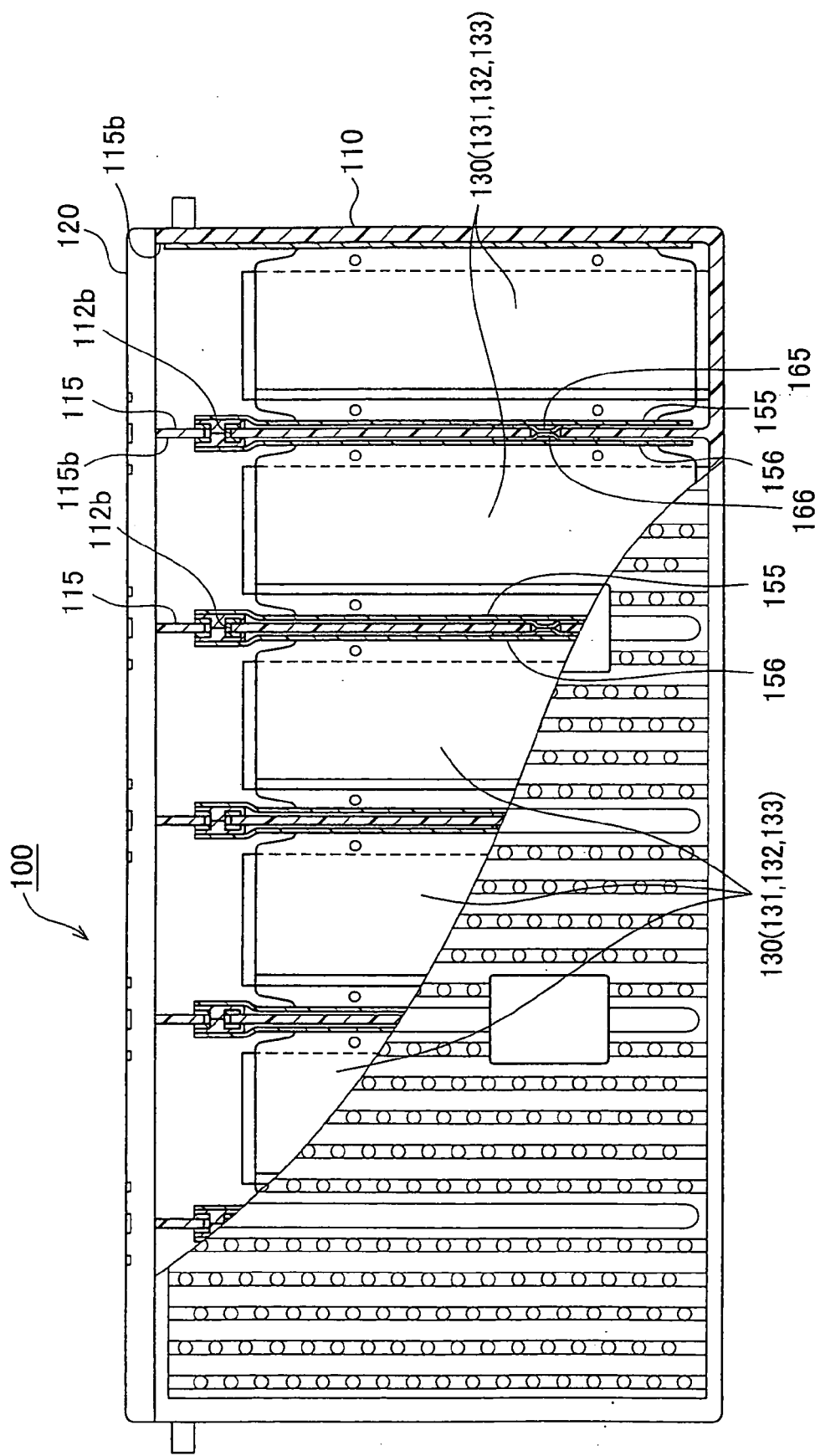
FIG. 12 is a partial cutaway view of a battery.

The battery case 110 has a rectangular parallelepiped shape divided into six compartments 115 by partition walls 112 as shown in FIGS. 1 and 2. In each of the compartments 115, an electrode assembly 130 (positive electrode plates 131, negative electrode plates 132, and separators 133, which are laminated) is housed in connection with a positive current collector 155 and a negative current collector 156 (see FIG. 12) respectively.

Figure 3:
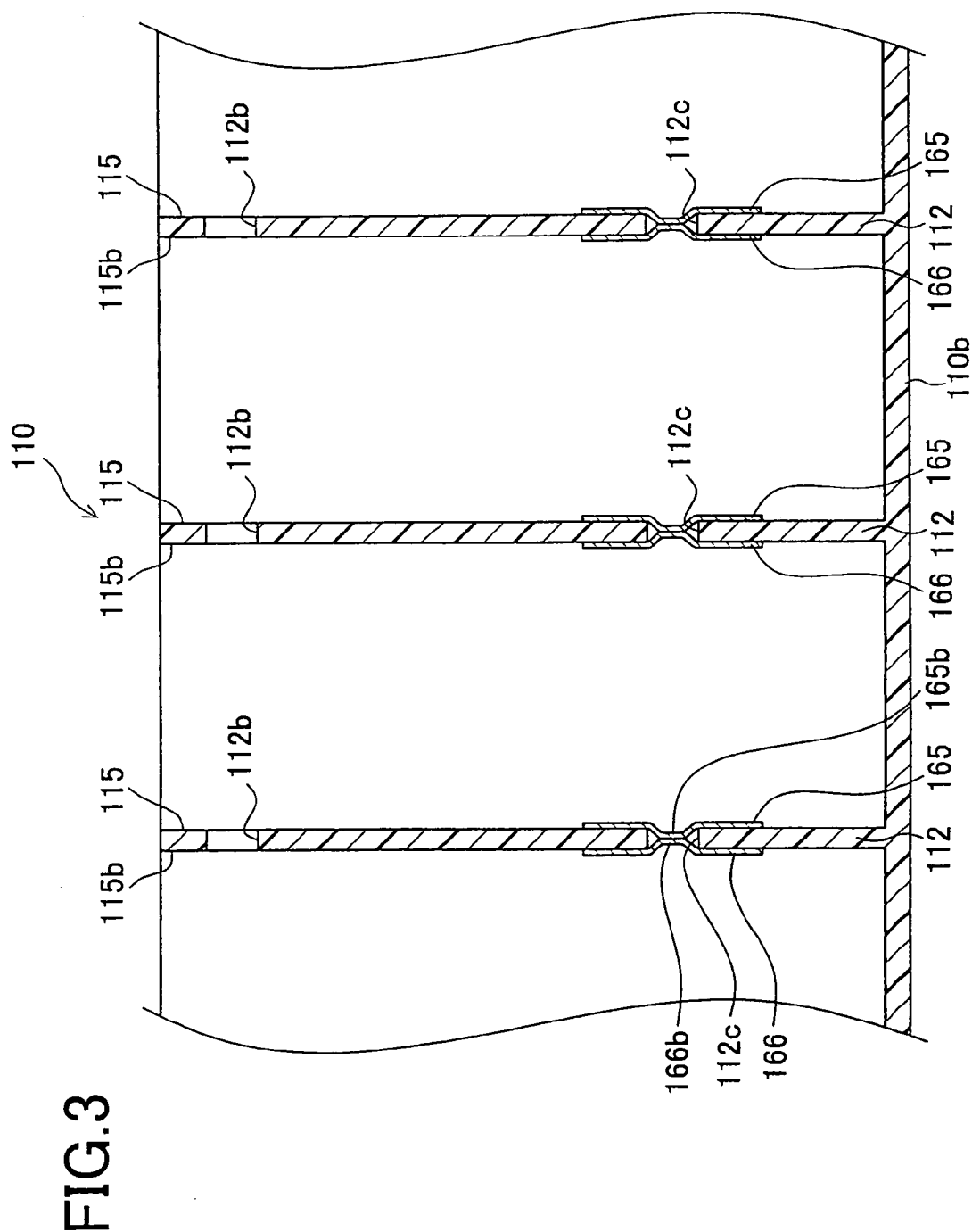
FIG. 3 is a cross sectional view of the battery case in the embodiment, taken along a line B-B in FIG. 1.

Each partition wall 112 of the battery case 110 is perforated with a communication hole 112c providing communication adjoining compartments 115 as shown in FIG. 3. This communication hole 112c is arranged in a place near a bottom 110b when the partition wall 112 is viewed in a depth direction of the battery case 110 (in a vertical direction in FIG. 3).

Figure 13:
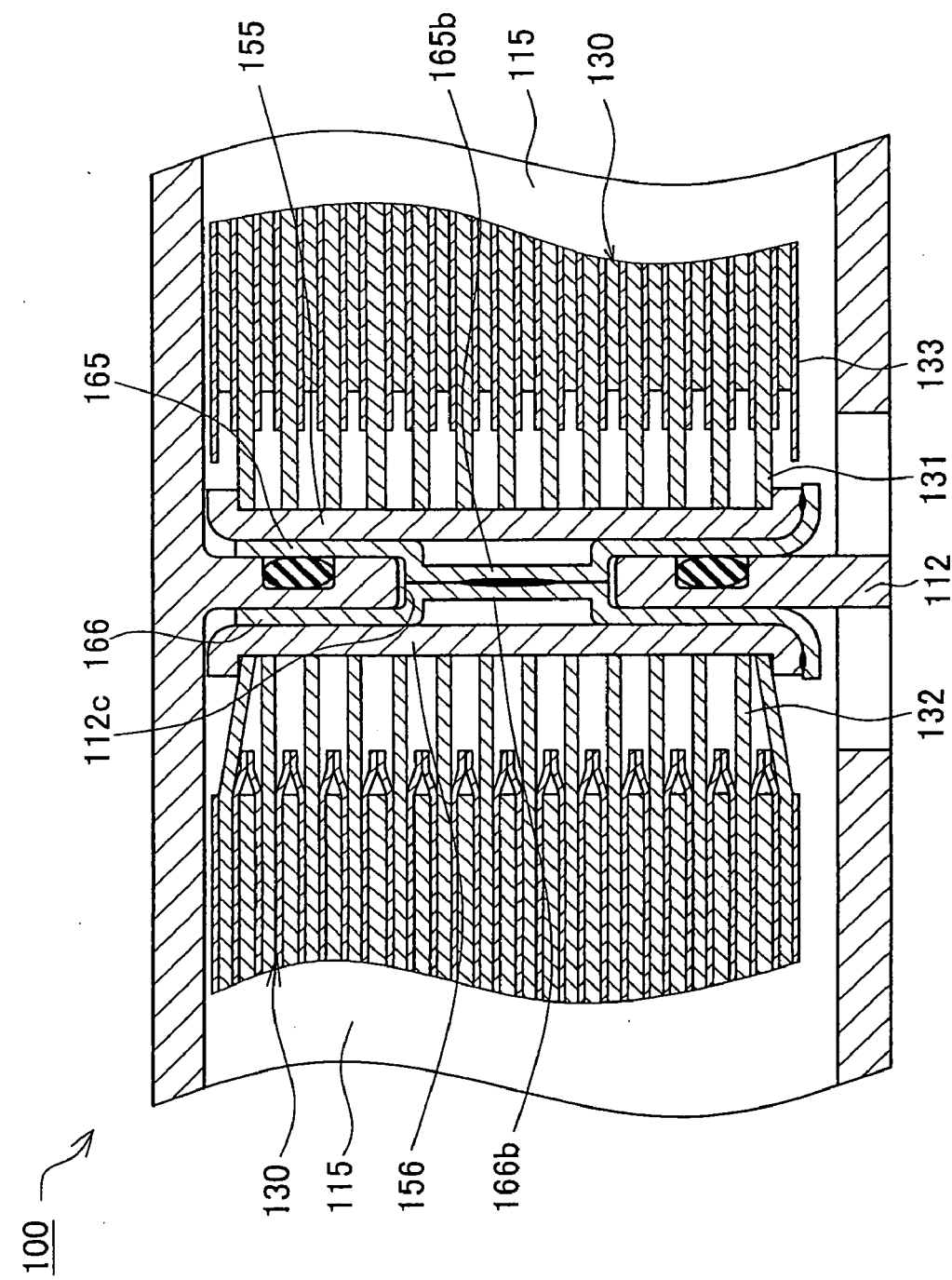
FIG. 13 is a partial cross sectional view of the battery taken along a lamination direction of an electrode assembly (a direction perpendicular to a drawing sheet of FIG. 12) at a position passing the center of a communication hole.

In this embodiment, the battery component 165 placed in one compartment 115 is resistance-welded to the battery component 166 placed in the adjoining compartment 115 through the communication hole 112c in each partition wall 112. The battery component 165 is formed at its center with a protrusion 165b having an insertable shape in the communication hole 112c (see FIG. 3). Similarly, the battery component 166 is formed at its center with a protrusion 166b having an insertable shape in the communication hole 112c. The battery components 165 and 166 in this embodiment correspond to a conductive connecting plate for electrically connecting the positive current collector 155 coupled to one electrode assembly 130 and the negative current collector 156 coupled to the adjoining electrode assembly 130 through the communication hole 112c of the partition wall 112 (see FIG. 13).

Figure 4:
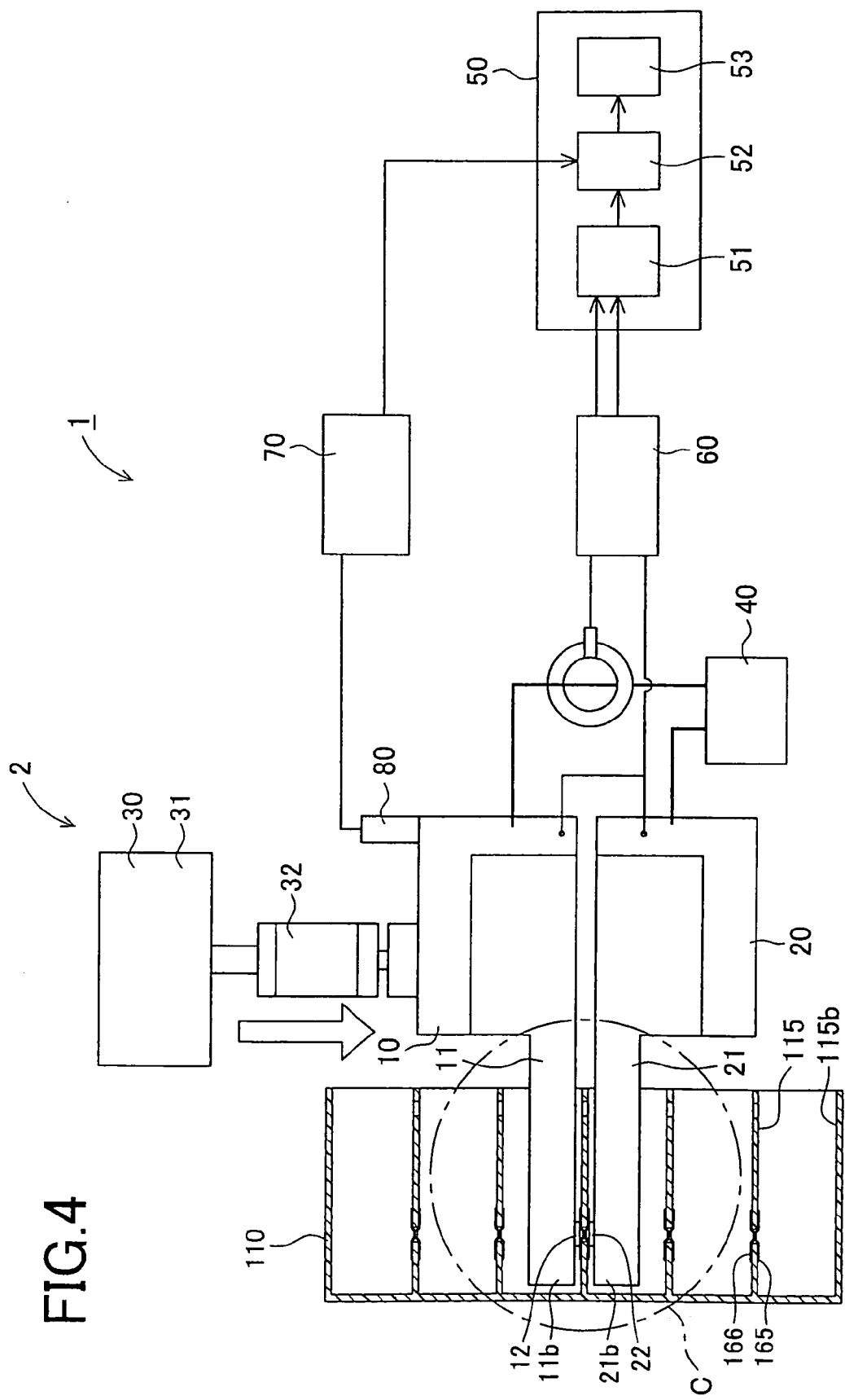
FIG. 4 is a structural view of a resistance welding system in the embodiment.

The resistance welding system 1 includes, as shown in FIG. 4, a resistance welding machine 2, a determination device 50, a voltage/current meter 60, an acceleration sensor amplifier 70, and an acceleration sensor pickup 80. The resistance welding machine 2 includes a movable gun unit 10, a fixed gun unit 20, a movable pressure device 30, and a power supply 40.

The movable gun unit 10 includes a movable gun arm 11 and a welding electrode 12 fixed to a distal end 11b of the gun arm 11. This gun unit 10 is movable in a vertical direction by activation of the movable pressure device 30. The fixed gun unit 20 includes a fixed gun arm 21 and a welding electrode 22 fixed to a distal end 21b of the gun arm 21. The pressure device 30 includes a cylinder 31 extensible in the vertical direction and a pressure spring 32 attached to an end of the cylinder 31.

Figure 5:
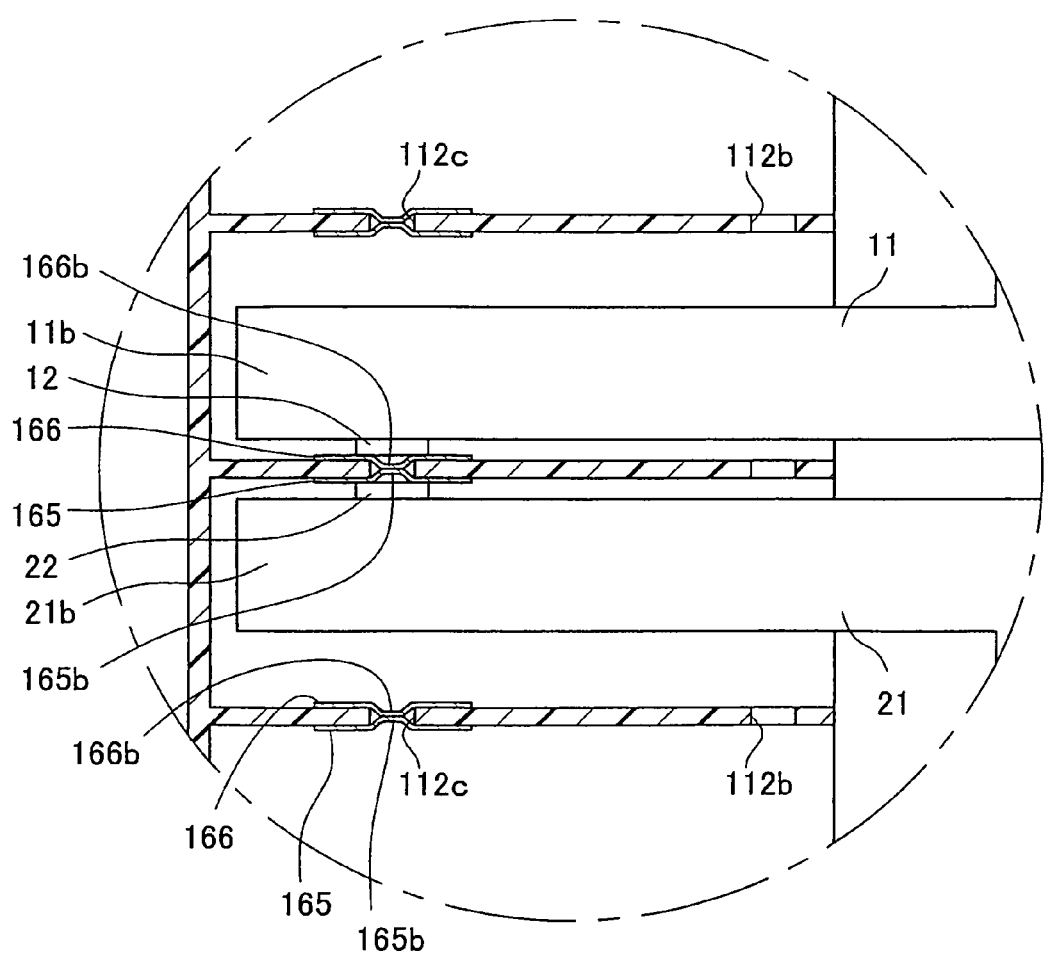
FIG. 5 is an enlarged view of a section C in FIG. 4.

In this embodiment, as shown in FIG. 5, the welding electrode 22 of the fixed gun unit 20 is disposed in contact with the battery component 165 while the protrusion 165b of the battery component 165 is disposed in contact with the protrusion 166b of the battery component 166 through the communication hole 112c of the partition wall 112. Then, the movable pressure device 30 is activated to move the movable gun unit 10 downward. Accordingly, the welding electrode 22 of the fixed gun unit 20 and the welding electrode 12 of the movable gun unit 10 press therebetween the battery components 165 and 166 from below and above. In this state, a welding current is supplied to the electrodes 22 and 12 from the power supply 40 and thus the protrusion 165b of the battery component 165 and the protrusion 166b of the battery component 166 are resistance-welded to each other. In this embodiment, the welding current for resistance welding is supplied for 100 ms.

The current/voltage meter 60 is to measure a current value of the welding current flowing in the welding electrodes 12 and 22 and a voltage value applied to the welding electrodes 12 and 22 (a voltage value between the welding electrode 12 and the welding electrode 22).

The acceleration sensor pickup 80 is fixed to the movable gun unit 10 to detect the acceleration of the gun unit 10 in a direction of pressing the battery components 165 and 166 between the welding electrodes 12 and 22 (hereinafter, simply referred to as a pressing direction, corresponding to a vertical direction in FIGS. 4 and 5). The acceleration sensor amplifier 70 is to amplify a signal transmitted thereto from the acceleration sensor pickup 80 and transmit it to the determination device 50.

The determination device 50 includes a welding resistance value calculating section 51, a welding resistance value correcting section 52, and a welding quality determining section 53. This determination device 50 is constituted of a microcomputer comprising a ROM, a RAM, a CPU and others.

In this embodiment, the determination device 50 corresponds to a resistance welding quality determination apparatus.

This determination device 50 detects a current value I of the welding current flowing in the welding electrodes 12 and 22 and a voltage value V applied to the welding electrodes 12 and 22 through the current/voltage meter 60 at predetermined time intervals (e.g., every 0.1 ms) during a resistance welding period (100 ms for which the welding current is supplied). The determination device 50 also detects the acceleration of the movable gun unit 10 through the acceleration sensor pickup 80 and the acceleration sensor amplifier 70 at predetermined time intervals in sync with the detection time of the current value I and the voltage value V. Based on the detected voltage value and the detected current value, consequently, the welding resistance value calculating section 51 calculates a welding resistance value Ra (=V/I) at each of the predetermined time intervals.

In the resistance welding machine 2 in this embodiment, meanwhile, the movable gun unit 10 is apt to vibrate in the pressing direction (in the vertical direction in FIGS. 4 and 5) during resistance welding. In particular, the movable gun arm 11 has a shape extending in the direction perpendicular to the pressing direction, i.e., in a lateral direction in FIGS. 4 and 5 and therefore the gun unit 10 is likely to greatly vibrate in the pressing direction during resistance welding. It is to be noted that the gun arm 11 is designed to be so long in the direction perpendicular to the pressing direction (in the lateral direction in FIGS. 4 and 5) as to make the welding electrode 12 reach the battery component 166 placed in a position apart from an opening 115b of the battery case 110 (i.e., in a position near the bottom 110b).

If the gun unit 10 greatly vibrates in the pressing direction during resistance welding, the contact resistance between the battery component 166 and the welding electrode 12 will vary largely. In such case, the variation in contact resistance is reflected in the welding resistance value Ra. Accordingly, this welding resistance value Ra also varies largely (see FIG. 10).

However, the variation in contact resistance between the battery component 166 and the welding electrode 12 is completely unrelated to the change in a welding state (welding quality) of a welded portion (a joined portion) of the battery component 165 and the battery component 166. Therefore, in the case where the welding quality is evaluated based on the welding resistance value Ra in which the contact resistance variation is reflected, it is not possible to appropriately determine the quality of resistance welding.

On the other hand, in the determination device 50 in this embodiment, the welding resistance value correcting section 52 corrects the calculated welding resistance value Ra (i.e., obtains a corrected welding resistance value Rb) based on a change amount $\Delta R1$ of the contact resistance value $R1$ between the battery component 166 and the welding electrode 12, the change amount being corresponding to the detected acceleration of the movable gun unit 10. Specifically, the corrected welding resistance value Rb (=Ra−$\Delta R1$) by subtracting the change amount $\Delta R1$ of the contact resistance value $R1$ from the welding resistance value Ra.

If the movable gun arm 11 vibrates, the movable gun unit 10 will be accelerated. According to the acceleration A of the gun unit 10, the change amount $\Delta R1$ of the contact resistance value $R1$ between the battery component 166 and the welding electrode 12 is determined. In this embodiment, therefore, the acceleration A of the gun unit 10 is detected and then the welding resistance value Ra is corrected based on the change amount $\Delta R1$ of the contact resistance value $R1$ corresponding to the detected acceleration of the gun unit 10. This can obtain an appropriate corrected welding resistance value Rb from which the influence of variation in the contact resistance value $R1$ is eliminated.

Figure 6:
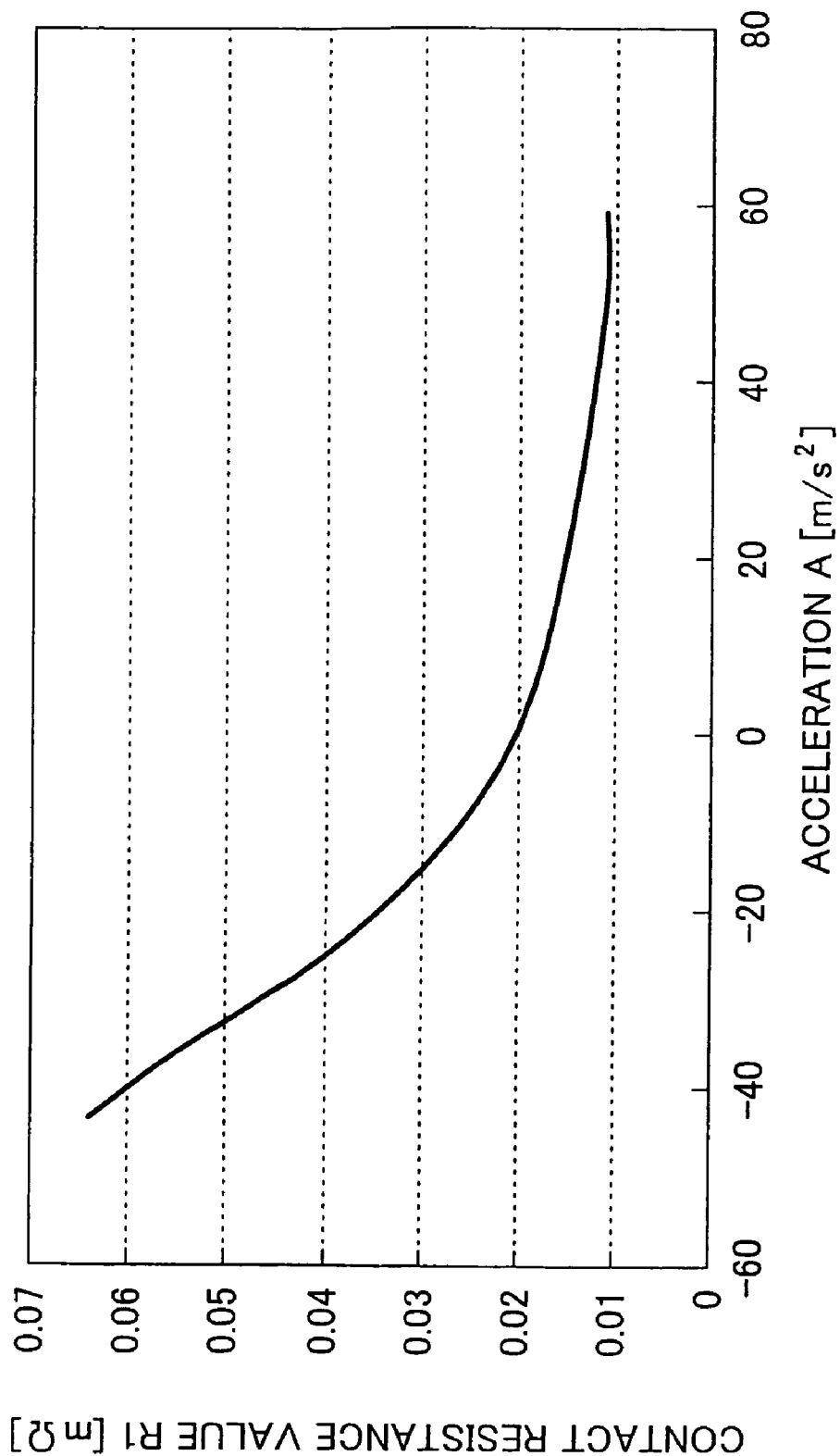
FIG. 6 is a graph showing the relation between acceleration of a movable gun unit and contact resistance between a battery component and a welding electrode.

Herein, FIG. 6 shows the corresponding relation between the acceleration A ($m/s^2$) of the movable gun unit 10 and the contact resistance value $R1$ (m$\Omega$) between the battery component 166 and the welding electrode 12. The acceleration A is indicated by assuming the direction of pressing the battery component 166 by the welding electrode 12 (a downward direction in FIG. 4) as negative and the opposite direction to the pressing direction (an upward direction in FIG. 4) as positive.

The graph in FIG. 6 is obtained as follows. The battery components 165 and 166 are actually resistance-welded by use of the resistance welding machine 2, and the acceleration A of the movable gun unit 10, the voltage value between the battery component 166 and the welding electrode 12, and the current value flowing in the welding electrode 12 are detected at predetermined time intervals (e.g., every 1 ms) during a welding period (100 ms). From the voltage value and the current value detected at each of the predetermined time intervals, the contact resistance value $R1$ between the battery component 166 and the welding electrode 12 at each of the predetermined time intervals is calculated. Based on those results, the corresponding relation between the acceleration of the movable gun unit 10 and the contact resistance value $R1$ is obtained and plotted in the graph of FIG. 6.

Figure 7:
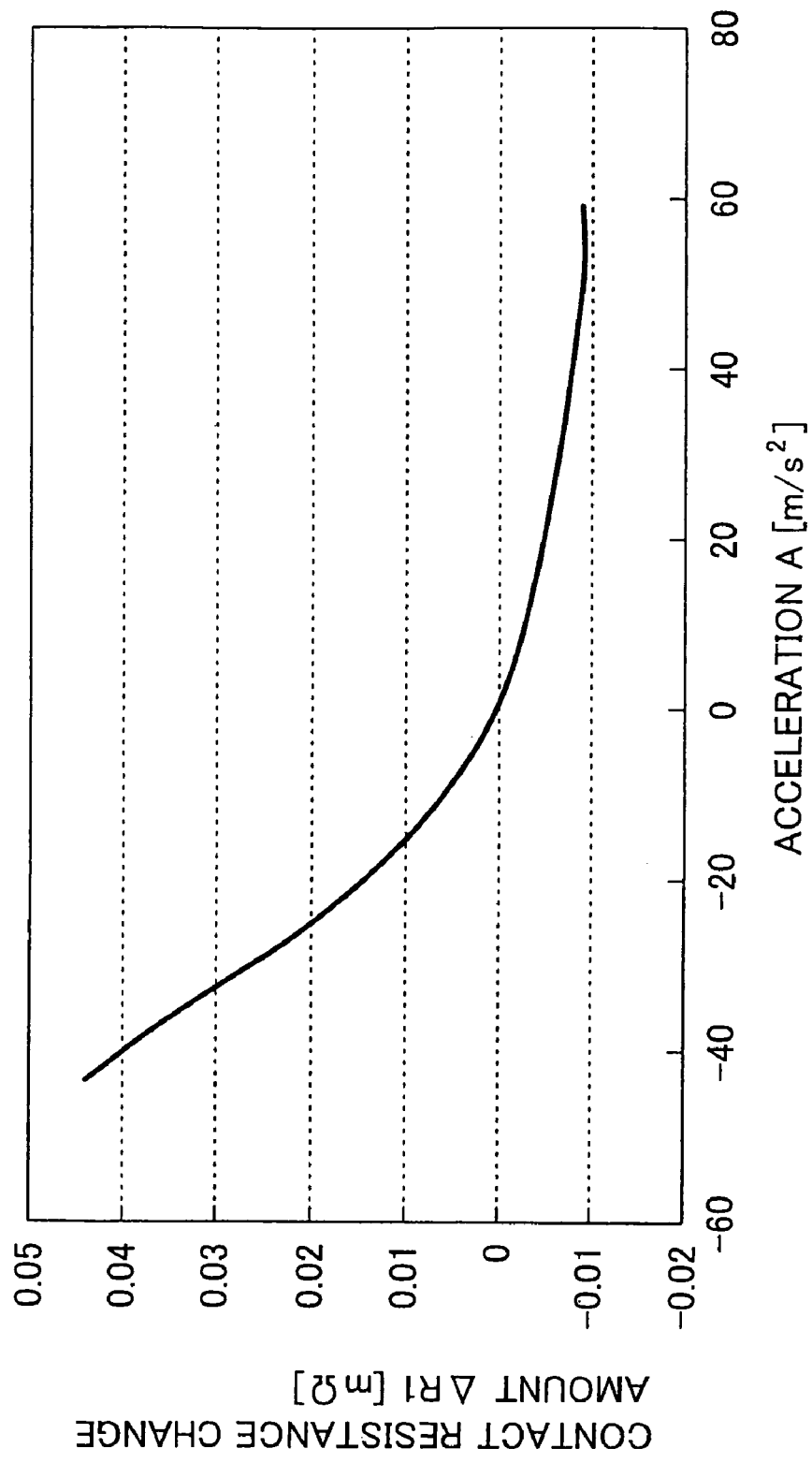
FIG. 7 is a graph showing the relation between the acceleration of the movable gun unit and a change amount in contact resistance between the battery component and the welding electrode.

Furthermore, when the graph of FIG. 6 is converted to the corresponding relation assuming that the contact resistance value $R1$ (0.02 m$\Omega$ in FIG. 6) for the acceleration A of zero is a reference (a change amount: zero), the corresponding relation between the acceleration A of the movable gun unit 10 and the change amount $\Delta R1$ of the contact resistance value $R1$ can be obtained. The obtained graph is shown in FIG. 7. As shown in FIG. 7, the change amount $\Delta R1$ of the contact resistance value $R1$ between the battery component 166 and the welding electrode 12 is determined in correspondence with the acceleration A of the movable gun unit 10. In this embodiment, accordingly, the determination device 50 detects the acceleration A of the gun unit 10, obtains the change amount ΔR1 of the contact resistance value R1 corresponding to the detected acceleration A based on the data shown in FIG. 7, and then subtracts the change amount ΔR1 from the welding resistance value Ra to obtain the corrected welding resistance value Rb (=Ra−ΔR1).

The data shown in FIG. 7 is preferably stored in advance in the ROM of the determination device 50 in the form of for example a data map representing the corresponding relation between the acceleration A of the movable gun unit 10 and the change amount ΔR1 of the contact resistance value R1. A relational expression (an arithmetic expression) derived from the graph of FIG. 7 may also be stored in advance in the ROM of the determination device 50. Based on the data map and the arithmetic expression, the change amount ΔR1 of the contact resistance value R1 corresponding to the detected acceleration A can be obtained.

Furthermore, in the determination device 50 in this embodiment, the welding quality determining section 53 determines the quality of resistance welding of the battery component 165 and the battery component 166 based on the corrected welding resistance value Rb. To be more specific, the corrected welding resistance value Rb is compared with the previously set threshold Rth to check whether or not splash occurs in the welded portion. It is therefore possible to accurately determine the quality of resistance welding without being influenced by variation in contact resistance between the battery component 166 and the welding electrode 12 resulting from the vibration of the movable gun unit 10.

In case splash occurs, meanwhile, the corrected welding resistance value Rb (specifically, a resistance value of the welded portion) increases as compared with the case where no splash occurs. Accordingly, the threshold Rth is previously set between the corrected welding resistance value Rb obtained when splash occurs and the corrected welding resistance value Rb obtained when no splash occurs. When the corrected welding resistance value Rb obtained during resistance welding exceeds the threshold Rth, it can be determined that splash occurs.

In this embodiment, many tests were actually conducted by use of the resistance welding machine 2 to resistance weld the battery components 165 and 166, and the presence/absence of splash was visually checked at each resistance welding test. Furthermore, the threshold Rth was set between the corrected welding resistance value Rb obtained when splash occurs and the corrected welding resistance value Rb obtained when no splash occurs. The corrected welding resistance value Rb (specifically, the resistance value of the welded portion) gradually increases as the welding time advances even when no splash occurs. In this embodiment, therefore, the threshold Rth was also set to be gradually larger as the welding time advances (see FIGS. 8 to 10).

Figure 8:
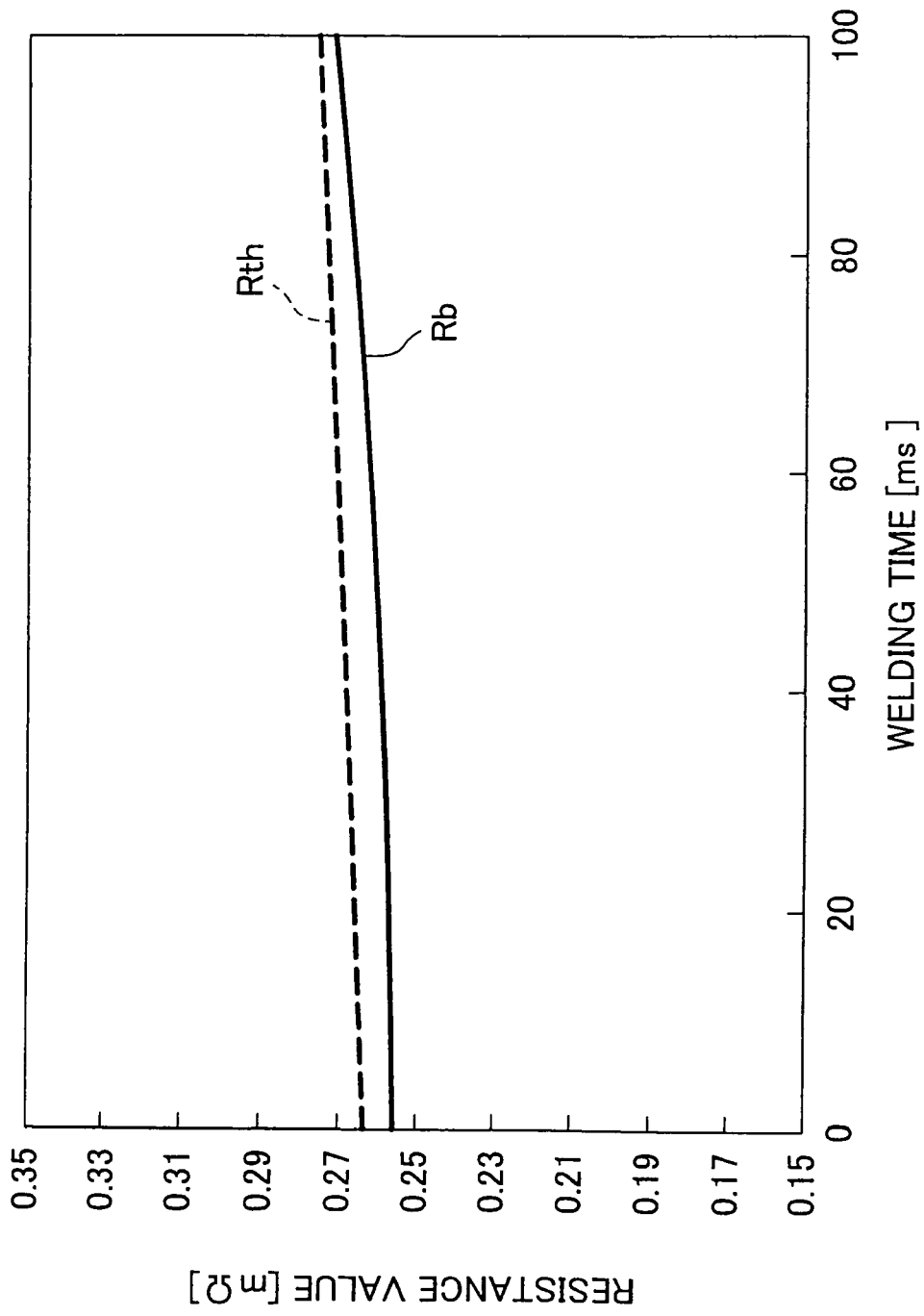
FIG. 8 is a graph showing the relation between a welding time and a corrected welding resistance value when no splash occurs.
Figure 9:
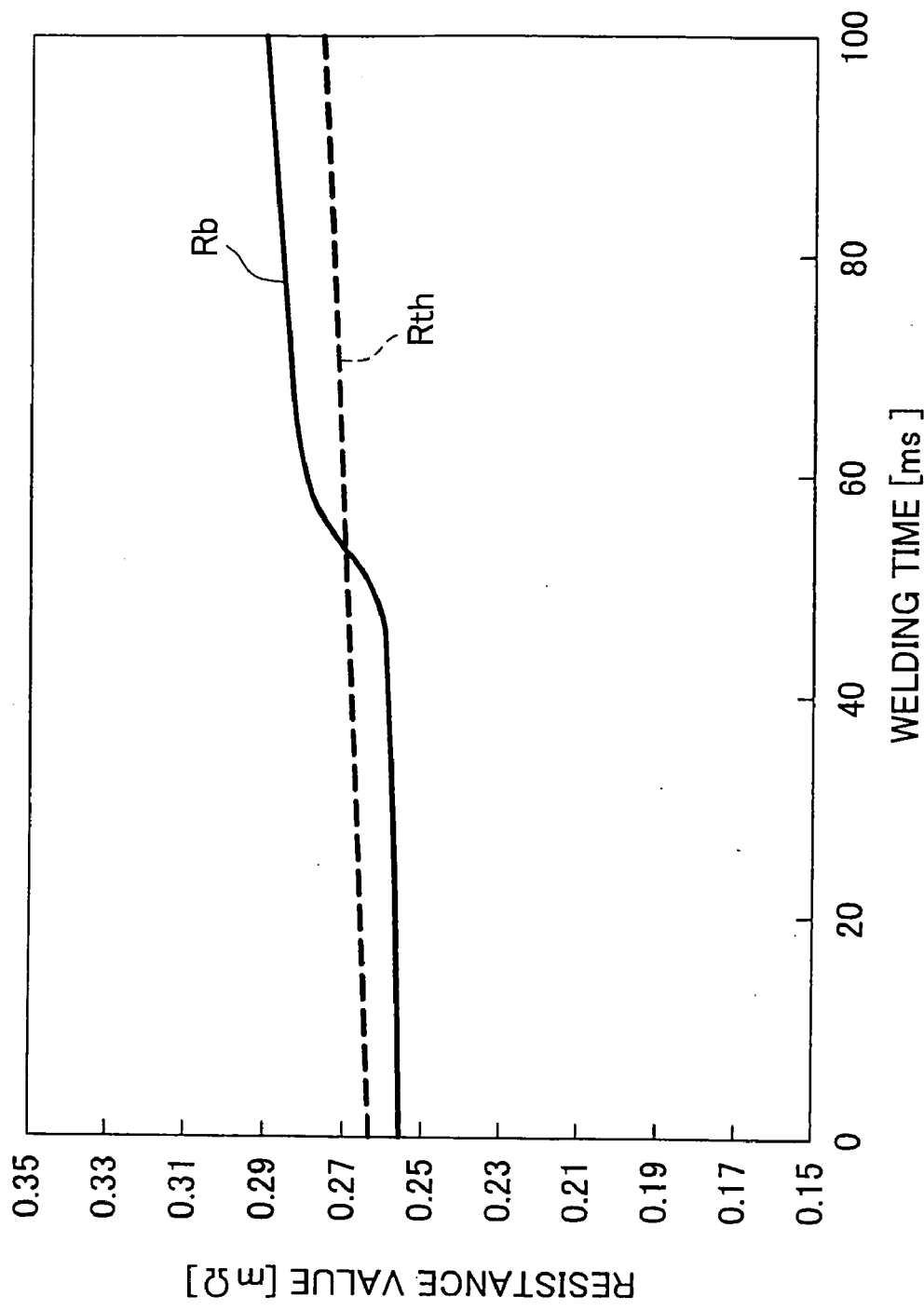
FIG. 9 is a graph showing the relation between the welding time and the corrected welding resistance value when splash occurs.

Herein, FIG. 8 shows a graph exhibiting one example of the corresponding relation between the welding time (ms) and the corrected welding resistance value Rb (mΩ) when no splash occurs. FIG. 9 shows a graph exhibiting one example of the corresponding relation between the welding time (ms) and the corrected resistance value Rb (mΩ) when splash occurs. FIGS. 8 and 9 also show the threshold Rth (mΩ).

As shown in FIG. 8, when no splash occurs, the corrected welding resistance value Rb does not exceed the threshold Rth during the resistance welding period (100 ms for which the welding current is supplied). In this case, therefore, the determination device 50 determines that no splash occurs (welding success).

On the other hand, when splash occurs, the corrected welding resistance value Rb sharply increases and exceeds the threshold Rth. In this case, therefore, the determination device 50 determines that splash occurs (welding failure). In the example shown in FIG. 9, it is estimated that splash occurred after a lapse of about 50 ms from the welding start.

Figure 10:
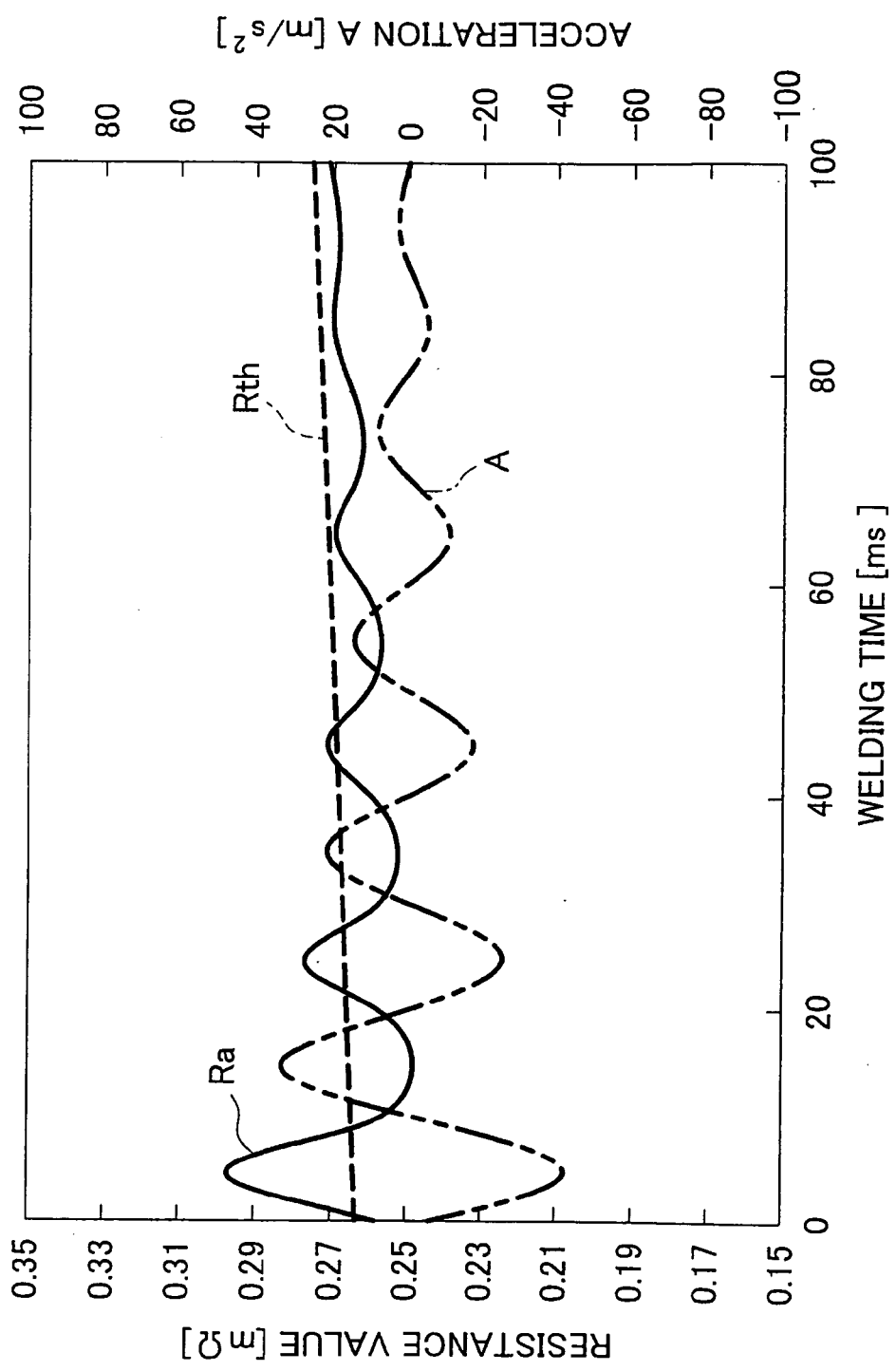
FIG. 10 is a graph showing the relation between the welding time and the welding resistance value (no correction) when no splash occurs.

FIG. 10 shows a graph exhibiting one example of the corresponding relation between the welding time and the welding resistance value Ra (no correction) when no splash occurs. FIG. 10 also shows the threshold Rth and the acceleration A of the movable gun unit 10. A graph obtained by correcting the graph of FIG. 10 showing the welding resistance value Ra based on the corresponding relation between the acceleration A and the change amount ΔR1 of the contact resistance value R1 shown in FIG. 7 corresponds to the graph of FIG. 8 showing the corrected welding resistance value Rb.

The welding resistance value Ra greatly increases and decreases under the influence of the acceleration A of the movable gun unit 10 (that is, the influence of vibration of the gun unit 10) as shown in FIG. 10. Accordingly, even though no splash occurs, the welding resistance value Ra is apt to exceed the threshold Rth. Consequently, when the presence/absence of splash occurrence in the welded portion is determined by comparing the welding resistance value Ra (no correction) with the threshold Rth, it may be erroneously determined that splash occurs (abnormal) even though no splash occurs.

Next, a welding process in the present embodiment is explained in detail.

The battery case 110 is first prepared. The first battery component 165 is disposed in one compartment 115 so that the protrusion 165b is inserted in the communication hole 112c and the second battery component 166 is disposed in the adjoining compartment 115 so that the protrusion 166b is inserted in the same communication hole 112c, as shown in FIG. 3. In this state, the protrusion 165b of the first battery component 165 and the protrusion 166b of the second battery component 166 come into contact with each other.

By use of the resistance welding system 1, the first battery component 165 and the second battery component 166 are welded to each other at the protrusions 165b and 166b. To be concrete, the fixed gun unit 20 is inserted in the compartment 115 through the opening 115b of the battery case 110 and also the movable gun unit 10 is inserted in the adjoining compartment 115 through the opening 115b (see FIG. 4). As shown in FIG. 5, the welding electrode 22 of the fixed gun unit 20 is placed in contact with the battery component 165. In this state, the moving pressure device 30 is activated to move the movable gun unit 10 downward. Thus, the welding electrode 22 of the fixed gun unit 20 and the welding electrode 12 of the movable gun unit 10 press therebetween the battery components 165 and 166 from below and above. In this state, the welding current is supplied to the electrodes 22 and 12 from the power supply 40 to resistance-weld the protrusion 165b of the battery component 165 and the protrusion 166b of the battery component 166 each other. In the present embodiment, the welding current for resistance welding is supplied for 100 ms.

Figure 11:
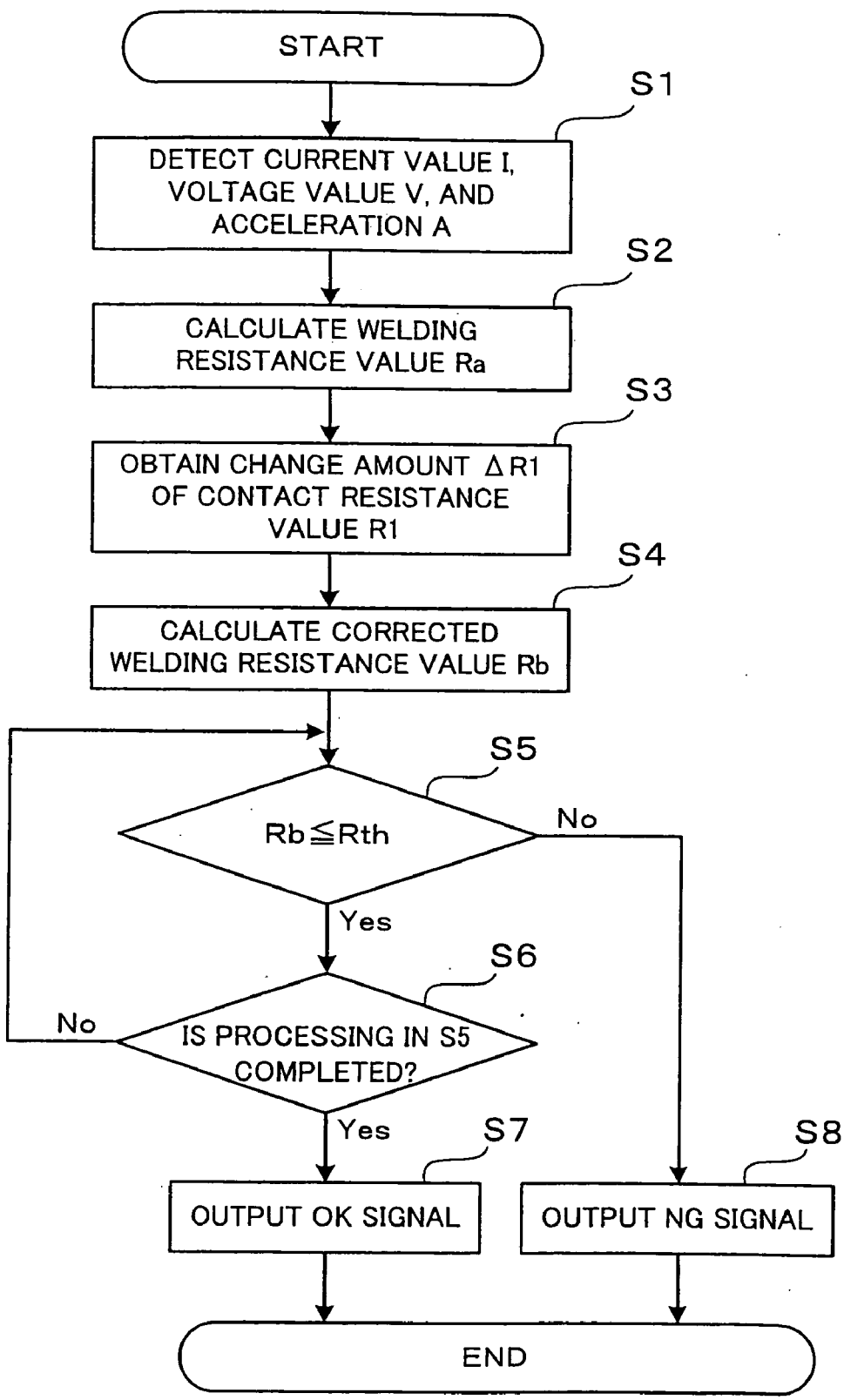
FIG. 11 is a flowchart showing the flow of a resistance welding quality determination method in the embodiment.

When the resistance welding is started (the welding current is supplied), the determination device 50 starts to determine the quality of resistance welding. Herein, the flow of the resistance welding quality determination method in this embodiment is shown in a flowchart in FIG. 11. In step S1, the current value I of the welding current flowing in the welding electrodes 12 and 22 and the voltage value V applied to those electrodes 12 and 22 are detected through the current/voltage meter 60 at predetermined time intervals (e.g., every 0.1 ms)

during the resistance welding period (100 ms for which the welding current is supplied). The determination device 50 also detects the acceleration A of the movable gun unit 10 through the acceleration sensor pickup 80 and the acceleration sensor amplifier 70 at predetermined time intervals in sync with detecting the current value I and the voltage value V.

In the present embodiment, the step S1 corresponds to a voltage value detection step, a current value detection step, and an acceleration detection step.

In step S2, successively, the determination device 50 (the welding resistance value calculating section 51) calculates the welding resistance value Ra (=V/I) at each of the predetermined time intervals based on the detected voltage value V and the detected current value I. In this embodiment, this step S2 corresponds to a welding resistance value calculating step.

In step S3, the determination device 50 (the welding resistance value correcting section 52) obtains the change amount ΔR1 of the contact resistance value R1 corresponding to the detected acceleration A of the movable gun unit 10 from the data map (data map created from the graph in FIG. 7) representing the corresponding relation between the acceleration A and the change amount ΔR1 of the contact resistance value R1. For instance, if the detected acceleration A is 20 m/s$^2$, the change amount ΔR1 is −0.005 mΩ (see FIG. 7).

In step S4, the determination device 50 (the welding resistance value correcting section 52) subtracts the change amount ΔR1 from the welding resistance value Ra to obtain the corrected welding resistance value Rb (=Ra−ΔR1). For instance, if the welding resistance value Ra is 0.255 ma and the change amount ΔR1 is −0.005 mΩ, the corrected welding resistance value Rb is calculated by the following expression:

$$Rb=0.255-(-0.005)=0.26\ (m\Omega).$$

In this embodiment, steps S3 and S4 correspond to a welding resistance value correcting step.

In step S5, the determination device 50 (the welding quality determining section 53) compares each corrected welding resistance value Rb obtained during the welding period (100 ms for which the welding current is supplied) with the threshold Rth at the same welding time. To be specific, it is determined whether or not each corrected welding resistance value Rb is the threshold Rth at the same welding time or less. For instance, in the example shown in FIG. 8, the corrected welding resistance value Rb=0.26 (mΩ) at the welding time of 50 ms is compared with the threshold Rth=0.27 (mΩ) at the welding time of 50 ms. In this case, the corrected welding resistance value Rb is determined to be the threshold Rth or less.

The method of comparing the corrected welding resistance value Rb with the threshold Rth may be achieved for example by creating the data map representing the corresponding relation between the welding time and the threshold Rth (see FIG. 8) in advance, storing the data map in the ROM of the determination device 50, and comparing each corrected welding resistance value Rb obtained in step S4 with the threshold Rth on the data map at the same welding time.

The processing in step S5 is conducted on all the corrected welding resistance values Rb obtained during the welding period (100 ms for which the welding current is supplied). For instance, in the case of detecting the current value I, the voltage value V, and the acceleration A at every 0.1 ms during the welding period, thousand corrected welding resistance values Rb are obtained in step S5. Each of the thousand corrected welding resistance values Rb is subjected to the processing in step S5.

If it is determined in step S5 that the corrected welding resistance value Rb is the threshold Rth or lower (S5: YES), the determination device 50 (the welding quality determining section 53) determines that no splash occurs. In step S6, the determination device 50 then determines whether or not the processing in step S5 is terminated. In other words, it is determined whether or not all the corrected welding resistance values Rb obtained during the welding period (100 ms for which the welding current is supplied) have been subjected to the processing in step S5. If it is determined in step S6 that the processing in step S5 is terminated (S6: YES), it represents that all the corrected welding resistance values Rb obtained during the welding period (100 ms for which the welding current is supplied) are determined to be the threshold Rth or less. In this case, accordingly, the flow advances to step S7, in which the determination device 50 (the welding quality determining section 53) outputs an OK signal representing resistance welding success (no splash occurs). Subsequently, the resistance welding of new battery components 165 and 166 is continued.

On the other hand, if it is determined in step S5 that the corrected welding resistance value Rb is not the threshold Rth or less (S5: NO), the determination device 50 (the welding quality determining section 53) determines that splash occurs. In step S8, the determination device 50 (the welding quality determining section 53) outputs an NG signal representing resistance welding failure (splash occurs). When the NG signal is outputted, the resistance welding is stopped and such battery case 110 is discarded as a reject.

In this embodiment, steps S5 to S8 correspond to a welding quality determining step.

As mentioned above, the battery case 110 in which the battery components 165 and 166 are normally resistance-welded to each other through the communication hole 112c in each of the partition walls 112 is shifted to a subsequent process. To be concrete, the electrode assembly 130 in which the positive current collector 155 and the negative current collector 156 are welded is housed in each of the compartments 115 in the battery case 110. Then, in each compartment 115, the positive current collector 155 and the battery component 165 are joined by laser welding and the negative current collector 156 and the battery component 166 are joined by laser welding (see FIG. 13). Furthermore, the positive current collector 155 placed in one compartment 115 and the negative current collector 156 placed in the adjoining compartment 115 are joined by resistance welding through the through hole 112b of the partition wall 112. An electrolyte is poured in each compartment 115 and then the opening 115b of the battery case 110 is closed by a lid 120. A battery 100 is thus completed (see FIG. 12).

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A method of determining welding quality of a work in a welding process for resistance welding the work by use of a resistance welding machine, comprising the steps of:
   detecting a voltage value applied to a welding electrode of the resistance welding machine during welding of the work;
   detecting a current value supplied to the welding electrode of the resistance welding machine during welding of the work;

calculating a welding resistance value, at predetermined time intervals during welding of the work, based on the voltage value and the current value;

correcting the welding resistance value, at predetermined time intervals during welding of the work, based on a change amount in contact resistance between the work and the welding electrode during welding of the work; and determining the welding quality of the work by comparing a corrected welding resistance value obtained by correcting the welding resistance value with a previously set threshold.

2. The method of determining resistance welding quality according to claim 1, wherein the resistance welding machine includes a movable gun unit having a movable gun arm and the welding electrode fixed to a distal end of the movable gun arm, the gun unit being configured to move to press the work through the welding electrode, the method further comprises a step of detecting acceleration of the movable gun unit in a direction of pressing the work by the welding electrode during welding of the work, and said step of correcting the welding resistance value includes correcting the welding resistance value based on a change amount in the welding resistance corresponding to the acceleration in said step of detecting acceleration of the movable gun unit.

3. The method of determining resistance welding quality according to claim 1, wherein said step of determining the welding quality includes determining whether or not splash occurs in a welded portion of the work by comparing the corrected welding resistance value with a previously set threshold.

4. The method of determining resistance welding quality according to claim 3, wherein the work is a battery component to be welded while it is placed in the battery case, and the quality of resistance welding of the battery component is determined in the welding process for resistance welding the battery component placed in the battery case by use of the resistance welding machine.

5. The method of determining resistance welding quality according to claim 1, wherein the resistance welding machine includes a movable gun unit having a movable gun arm and the welding electrode fixed to a distal end of the movable gun arm, the gun unit being configured to move to press the work through the welding electrode, and the movable gun arm has a shape extending in a direction perpendicular to the pressing direction of the work by the welding electrode.

6. An apparatus for determining welding quality of a work in a welding process for resistance welding the work by use of a resistance welding machine, the apparatus comprising:

a welding resistance value calculating section for calculating a welding resistance value, at predetermined time intervals during welding of the work, based on a voltage value applied to a welding electrode of the resistance welding machine and a current value supplied to the welding electrode;

a welding resistance value correcting section for correcting the welding resistance value, at predetermined time intervals during welding of the work, based on a change amount in contact resistance between the work and the welding electrode during welding of the work; and a welding quality determining section for determining welding quality of the work by comparing a corrected welding resistance value obtained by correcting the welding resistance value with a previously set threshold.

7. The resistance welding quality determination apparatus according to claim 6, wherein the resistance welding machine includes a movable gun unit having a movable gun arm and the welding electrode fixed to a distal end of the movable gun arm, the gun unit being configured to move to press the work through the welding electrode, and said welding resistance value correcting section is configured to correct the welding resistance value based on a change amount in the contact resistance corresponding to the acceleration of the movable gun unit in a direction of pressing the work by the welding electrode.

8. The resistance welding quality determination apparatus according to claim 6, wherein said welding quality determining section is configured to determine whether or not splash occurs in a welded portion of the work by comparing the corrected welding resistance value with a previously set threshold.

9. A method of determining welding quality of a work in a welding process for resistance welding the work by use of a resistance welding machine, including a movable gun unit having a movable gun arm and the welding electrode fixed to a distal end of the movable gun arm, the gun unit being configured to move to press the work through the welding electrode, comprising the steps of:

detecting a voltage value applied to a welding electrode of the resistance welding machine during welding of the work;

detecting a current value supplied to the welding electrode of the resistance welding machine during welding of the work;

detecting acceleration of the movable gun unit in a direction of pressing the work by the welding electrode during welding of the work;

calculating a welding resistance value based on the voltage value and the current value;

correcting the welding resistance value based on a change amount in contact resistance between the work and the welding electrode during welding of the work corresponding to the acceleration of the movable gun unit; and determining the welding quality of the work based on a corrected welding resistance value obtained by correcting the welding resistance value.

10. The method of determining resistance welding quality according to claim 9, wherein said step of determining the welding quality includes determining whether or not splash occurs in a welded portion of the work by comparing the corrected welding resistance value with a previously set threshold.

11. The method of determining resistance welding quality according to claim 10, wherein the work is a battery component to be welded while it is placed in the battery case, and the quality of resistance welding of the battery component is determined in the welding process for resistance welding the battery component placed in the battery case by use of the resistance welding machine.

12. The method of determining resistance welding quality according to claim 9, wherein the movable gun arm has a shape extending in a direction perpendicular to the pressing direction of the work by the welding electrode.

13. An apparatus for determining welding quality of a work in a welding process for resistance welding the work by use of a resistance welding machine, including a movable gun unit having a movable gun arm and the welding electrode fixed to a distal end of the movable gun arm, the gun unit being configured to move to press the work through the welding electrode, the apparatus comprising:
- a welding resistance value calculating section for calculating a welding resistance value based on a voltage value applied to a welding electrode of the resistance welding machine and a current value supplied to the welding electrode;
- a welding resistance value correcting section for correcting the welding resistance value based on a change amount in contact resistance between the work and the welding electrode during welding of the work and corresponding to the acceleration of the movable gun unit in a direction of pressing the work by the welding electrode; and
- a welding quality determining section for determining welding quality of the work based on a corrected welding resistance value obtained by correcting the welding resistance value.

14. The resistance welding quality determination apparatus according to claim 13, wherein
- said welding quality determining section is configured to determine whether or not splash occurs in a welded portion of the work by comparing the corrected welding resistance value with a previously set threshold.

* * * * *